US010460439B1

(12) United States Patent
Remiszewski et al.

(10) Patent No.: US 10,460,439 B1
(45) Date of Patent: Oct. 29, 2019

(54) METHODS AND SYSTEMS FOR IDENTIFYING CELLULAR SUBTYPES IN AN IMAGE OF A BIOLOGICAL SPECIMEN

(71) Applicant: CIRECA THERANOSTICS, LLC, Parsippany, NJ (US)

(72) Inventors: Stanley H. Remiszewski, Spencer, MA (US); Max Diem, Boston, MA (US); Xinying Mu, Malden, MA (US); Clay M. Thompson, Camano Island, WA (US); Aysegul Ergin, Arlington, MA (US)

(73) Assignee: CIRECA THERANOSTICS, LLC, Parsippany, NJ (US)

( * ) Notice: Subject to any disclaimer, the term of this patent is extended or adjusted under 35 U.S.C. 154(b) by 0 days.

(21) Appl. No.: 15/236,061

(22) Filed: Aug. 12, 2016

Related U.S. Application Data

(60) Provisional application No. 62/204,340, filed on Aug. 12, 2015.

(51) Int. Cl.
*G06K 9/00* (2006.01)
*G06T 7/00* (2017.01)
*G01J 5/02* (2006.01)

(52) U.S. Cl.
CPC .......... *G06T 7/0012* (2013.01); *G06T 7/0081* (2013.01); *G06T 2207/30024* (2013.01)

(58) Field of Classification Search
USPC ....... 382/100, 103, 106, 128–134, 165, 168, 382/173, 181, 190, 214, 219, 224, 232,
(Continued)

(56) References Cited

U.S. PATENT DOCUMENTS 1,996,141 A 4/1935 Broadhurst et al.
5,713,364 A 2/1998 DeBaryshe et al.
(Continued)

FOREIGN PATENT DOCUMENTS

JP H05-207363 A 8/1993
JP H11-283019 A 10/1999
(Continued)

OTHER PUBLICATIONS

Bird, B., et al., "Spectral detection of micro-matastases in lymph node histopathology," Journal of Biophotonics. vol. 2, Issue 1-2, pp. 37-46.

*Primary Examiner* — Seyed Azarian
(74) *Attorney, Agent, or Firm* — Arent Fox LLP

(57) ABSTRACT

Methods and systems for identifying biologic subtypes in a biological specimen may include receiving a data set associated with a cohort of biological specimens, determining a potential number of clusters associated with the data set, associating a cluster with one or more data points in the data set, associating a cluster label with the one or more data points in the data set, treating a related cluster as a biologic subtype and associating a biologic subtype with one or more data points with regions of interest in the data set, establishing duster features and metrics in the data set, determining if a new biologic subtype is identified by comparing the biologic subtype associated with the regions of interest with known biologic subtypes, and discovering a new diagnostic, prognostic, predictive, and/or therapeutic biologic subtype by correlating a new biologic subtype with patient, prognostic, predictive, therapeutic and/or clinical trial data.

11 Claims, 11 Drawing Sheets

(58) Field of Classification Search
USPC ....... 382/254, 274, 276, 286–291, 305, 312, 382/321; 436/64; 250/339.11
See application file for complete search history.

(56) References Cited

U.S. PATENT DOCUMENTS

| | | | |
|---|---|---|---|
| 5,945,674 A * | 8/1999 | Dukor | G01N 21/552 250/339.11 |
| 6,002,476 A | 12/1999 | Treado | |
| 6,037,772 A | 3/2000 | Karczmar et al. | |
| 6,215,554 B1 | 4/2001 | Zhang | |
| 6,274,871 B1 | 8/2001 | Dukor et al. | |
| 6,348,325 B1 | 2/2002 | Zahniser et al. | |
| 6,661,501 B1 | 12/2003 | Zahniser et al. | |
| 6,665,060 B1 | 12/2003 | Zahniser et al. | |
| 6,697,507 B1 | 2/2004 | Chapman | |
| 6,841,388 B2 | 1/2005 | Dukor et al. | |
| 7,006,674 B1 | 2/2006 | Zahniser et al. | |
| 7,496,220 B2 | 2/2009 | Izzia et al. | |
| 8,208,698 B2 | 6/2012 | Bogdan | |
| 8,598,998 B2 | 12/2013 | Vassilev et al. | |
| 8,736,685 B1 | 5/2014 | Dorenbosch | |
| 9,008,407 B2 | 4/2015 | Tanji | |
| 9,025,850 B2 | 5/2015 | Diem | |
| 2002/0164810 A1 * | 11/2002 | Dukor | G01N 33/57415 436/64 |
| 2003/0016860 A1 | 1/2003 | Sugawara | |
| 2003/0026762 A1 | 2/2003 | Malmros et al. | |
| 2004/0131241 A1 | 7/2004 | Curry et al. | |
| 2004/0186382 A1 | 9/2004 | Modell et al. | |
| 2006/0204071 A1 | 9/2006 | Ortyn | |
| 2006/0281068 A1 | 12/2006 | Maier et al. | |
| 2007/0111225 A1 | 5/2007 | Lambert et al. | |
| 2008/0037869 A1 | 2/2008 | Zhou | |
| 2008/0063280 A1 | 3/2008 | Hofman et al. | |
| 2009/0002702 A1 | 1/2009 | Maier et al. | |
| 2009/0086891 A1 | 4/2009 | Ofuji | |
| 2009/0112101 A1 | 4/2009 | Furness, III et al. | |
| 2009/0226059 A1 | 9/2009 | Levenson et al. | |
| 2009/0324051 A1 | 12/2009 | Hoyt et al. | |
| 2009/0326383 A1 | 12/2009 | Barnes et al. | |
| 2009/0326393 A1 | 12/2009 | Sethi et al. | |
| 2010/0021037 A1 | 1/2010 | Zahniser et al. | |
| 2010/0054622 A1 | 3/2010 | Adams | |
| 2010/0111396 A1 | 5/2010 | Boucheron | |
| 2010/0141752 A1 | 6/2010 | Yamada et al. | |
| 2010/0272334 A1 | 10/2010 | Yamada et al. | |
| 2011/0040169 A1 | 2/2011 | Kamen et al. | |
| 2011/0150314 A1 | 6/2011 | Bolea | |
| 2012/0010528 A1 | 1/2012 | Donovan et al. | |
| 2012/0157476 A1 | 6/2012 | Hebeisen et al. | |
| 2012/0275671 A1 * | 11/2012 | Eichhorn | G06T 7/0004 382/128 |
| 2012/0328178 A1 * | 12/2012 | Remiszewski | A61B 5/0071 382/133 |
| 2014/0286561 A1 * | 9/2014 | Remiszewski | G06K 9/00127 382/133 |

FOREIGN PATENT DOCUMENTS

| | | |
|---|---|---|
| JP | 3072948 B2 | 8/2000 |
| JP | 2003-503135 A | 1/2003 |
| JP | 2003-513278 A | 4/2003 |
| JP | 2004-053498 A | 2/2004 |
| JP | 2005-058378 A | 3/2005 |
| JP | 2005-181312 A | 7/2005 |
| JP | 2005524072 | 8/2005 |
| JP | 2005-535892 A | 11/2005 |
| JP | 2006-26015 A | 2/2006 |
| JP | 2006-026015 A | 8/2006 |
| JP | 2006-247293 A | 9/2006 |
| JP | 2006-350098 A | 12/2006 |
| JP | 2008-625158 A | 7/2008 |
| JP | 2008-533440 A | 8/2008 |
| JP | 2008-292195 A | 12/2008 |
| JP | 2009-036970 A | 2/2009 |
| JP | 2009-297295 A | 12/2009 |
| JP | 2010-145145 A | 7/2010 |
| JP | 2010-151830 A | 7/2010 |
| JP | 2010-197198 A | 9/2010 |
| JP | 2011-002341 A | 1/2011 |
| JP | 20101-035509 A | 2/2011 |
| KR | 10-2011-0005813 A | 1/2011 |
| WO | WO 93/03672 A1 | 3/1993 |
| WO | WO 01/33215 A1 | 5/2001 |
| WO | WO 2011/163624 A1 | 12/2001 |
| WO | WO 03/091729 A1 | 11/2003 |
| WO | WO 2006/083969 A2 | 8/2006 |
| WO | WO 2008/096232 A1 | 8/2008 |
| WO | WO 2009/146425 A1 | 12/2009 |
| WO | WO 2010/046968 A1 | 4/2010 |

* cited by examiner

METHODS AND SYSTEMS FOR IDENTIFYING CELLULAR SUBTYPES IN AN IMAGE OF A BIOLOGICAL SPECIMEN

RELATED APPLICATIONS

This application claims priority to U.S. Provisional Patent Application No. 62/204,340 titled "Method and Systems for Identifying Cellular Subtypes in an Image of a Biological Specimen" filed Aug. 12, 2015. This application contains subject matter related to U.S. Provisional Patent Application No. 62/065,421 titled "CLASSIFICATION OF MALIGNANT AND BENIGN TUMORS OF THE LUNG BY INFRARED SPECTRAL HISTOPATHOLOGY (SHP)" filed Oct. 17, 2014; U.S. patent application Ser. No. 13/067,777 titled "METHOD FOR ANALYZING SPECIMENS BY SPECTRAL IMAGING" filed Jun. 24, 2011; U.S. patent application Ser. No. 13/645,970 titled "METHOD AND SYSTEM FOR ANALYZING BIOLOGICAL SPECIMENS BY SPECTRAL IMAGING" filed Oct. 5, 2012; U.S. patent application Ser. No. 13/507,386 titled "METHOD FOR ANALYZING BIOLOGICAL SPECIMENS BY SPECTRAL IMAGING" filed Jun. 25, 2012; U.S. Provisional Patent Application No. 61/322,642 titled "A TUNABLE LASER-BASED INFRARED IMAGING SYSTEM" filed Apr. 9, 2010; U.S. patent application Ser. No. 12/994,647 filed titled "METHOD OF RECONSTITUTING CELLULAR SPECTRA USEFUL FOR DETECTING CELLULAR DISORDERS" filed Feb. 17, 2011, based on Patent Cooperation Treaty (PCT) Patent Appl. No. PCT/US2009/045681 titled "METHOD OF RECONSTITUTING CELLULAR SPECTRA USEFUL FOR DETECTING CELLULAR DISORDERS" having international filing date May 29, 2009, and claiming priority to U.S. Patent Appl. No. 61/056,955 titled "METHOD OF RECONSTITUTING CELLULAR SPECTRA FROM SPECTRAL MAPPING DATA" filed May 29, 2008, which is now U.S. Pat. No. 8,428,320, issued Apr. 23, 2013; U.S. Provisional Patent Appl. No. 61/358,606 titled "DIGITAL STAINING OF HISTOPATHOLOGICAL SPECIMENS VIA SPECTRAL HISTOPATHOLOGY" filed Jun. 25, 2010; U.S. patent application Ser. No. 13/084,287 titled "TUNABLE LASER-BASED INFRARED IMAGING SYSTEM AND METHOD OF USE THEREOF" filed Apr. 11, 2011; and to U.S. patent application Ser. No. 14/219,984 titled "METHOD AND SYSTEM FOR ANALYZING BIOLOGICAL SPECIMENS BY SPECTRAL IMAGING," filed Mar. 19, 2014, and claiming priority to U.S. application Ser. No. 13/645,970 titled "METHOD AND SYSTEM FOR ANALYZING BIOLOGICAL SPECIMENS BY SPECTRAL IMAGING," filed on Oct. 5, 2012, and to U.S. Provisional Application No. 61/803,376, filed Mar. 19, 2013. The entirety of each of the foregoing applications is hereby incorporated by reference herein.

BACKGROUND

One problem that exists in the art today is that there remains a lack of methods and systems that both improve detection of abnormalities in biological samples and deliver analytical results to a practitioner.

In the related art, a number of diseases may be diagnosed using classical cytopathology and histopathology methods involving examination of nuclear and cellular morphology and staining patterns. Typically, such diagnosis occurs via examining up to 10,000 cells in a biological sample and finding about 10 to 50 cells or a small section of tissue that may be abnormal. This finding is based on subjective interpretation of visual microscopic inspection of the cells in the sample.

An example of classical cytology dates back to the middle of the last century, when Papanicolaou introduced a method to monitor the onset of cervical disease by a test, commonly known as the "Pap" test. For this test, cells are exfoliated using a spatula or brush, and deposited on a microscope slide for examination. In the original implementation of the test, the exfoliation brush was smeared onto a microscope slide, hence the name "Pap smear." Subsequently, the cells were stained with hematoxylinleosin (H&E) or a "Pap stain" (which consists of H&E and several other counterstains), and were inspected visually by a cytologist or cyto-technician, using a low power microscope.

The microscopic view of such samples often shows clumping of cells and contamination by cellular debris and blood-based cells (erythrocytes and leukocytes/lymphocytes). Accordingly, the original "Pap-test" had very high rates of false-positive and false-negative diagnoses. Modern, liquid-based methods (such as cyto-centrifugation, the ThinPrep® or the Surepath® methods) have provided improved cellular samples by eliminating cell clumping and removing confounding cell types.

However, although methods for the preparation of samples of exfoliated cells on microscope slides have improved substantially, the diagnostic step of the related art still typically relies on visual inspection and comparison of the results with a data base in the cytologist's memory. Thus, the diagnosis is still inherently subjective and associated with low inter- and intra-observer reproducibility. To alleviate this aspect, other related art automated visual light image analysis systems have been introduced to aid cytologists in the visual inspection of cells. However, since the distinction between atypia and low grades of dysplasia is extremely difficult, such related art automatic, image-based methods have not substantially reduced the actual burden of responsibility on the cytologist.

In classical histopathology, tissue sections, rather than exfoliated individual cells, are inspected by a pathologist using a microscope after suitable staining of the tissue. To detect abnormalities, the pathologist focuses on gross tissue architecture, cell morphology, nuclear morphology, nucleus-to-cytoplasm ratio, chromatin distribution, presence of mitotic figures, and others. Since these criteria are morphology-based, their interpretation always will be somewhat subjective. Immuno-histochemical and other more recent methods are often used to augment the pathologist's subjective assessment of a tissue diagnosis.

Spectral methods have also been applied in the related art to the histopathological diagnosis of tissue sections available from biopsy. The data acquisition for this approach, referred to as "Spectral Histopathology (SHP)," can be carried out using the same spectral methodology used for spectral cytopathology ("SCP").

In some methods of the related art, a broadband infrared (IR) or other light output is transmitted to a sample (e.g., a tissue sample), using instrumentation, such as an interferometer, to create an interference pattern. Reflected and/or transmitted light is then detected, typically as an interference pattern. A Fast Fourier Transform (FFT) may then be performed on the detected pattern to obtain spectral information relating to each sample pixel. The resulting information is referred to as a pixel spectrum.

One limitation of the FFT based related art process is that the amount of radiative energy available per unit time in each band pass may be very low, due to use of a broadband infrared spectrum emission. As a result, the data available for processing with this approach is generally inherently noise limited. Further, in order to discriminate the received data from background noise, for example, with such low energy levels available, high sensitivity instruments must be used, such as high sensitivity liquid nitrogen cooled detectors (the cooling alleviates the effects of background IR interference). Among other drawbacks, such related art systems may incur great costs, footprint, and energy usage.

Thus, there remains a need in the art for devices, systems, and methods for analyzing IR and/or other similar transmissions for identifying cellular, tissue, biochemical, molecular and morphologic subtypes in an image of a biological specimen for diagnosis, prognosis, therapies and/or prediction of diseases and/or conditions.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for identifying biologic subtypes in a biological specimen. The method may include receiving a data set associated with a cohort of biological specimens and determining a potential number of clusters associated with the data set. The method may also include associating a cluster with one or more data points in the data set and associating a cluster label with the one or more data points in the data set. In addition, the method may include treating a related cluster as a biologic subtype and associating a biologic subtype with one or more data points with regions of interest in the data set. The method may also include establishing cluster features and metrics in the data set. The method may include determining if a new biologic subtype is identified by comparing the biologic subtype associated with the regions of interest with known biologic subtypes. The method may also include discovering a new diagnostic, prognostic, predictive, and/or therapeutic biologic subtype by correlating a new biologic subtype with patient, prognostic, predictive, therapeutic and/or clinical trial data.

Another aspect relates to a system for identifying biologic subtypes in a biological specimen. The system includes a memory in communication with a processor, wherein the memory and the processor are cooperatively configured to: receive a data set associated with a cohort of biological specimens; determine a potential number of clusters associated with the data set; associate a duster with one or more data points in the data set; associate a cluster label with the one or more data points in the data set; treat a related duster as a biologic subtype; associate a biologic subtype with one or more data points with regions of interest in the data set; establish cluster features and metrics in the data set; determine if a new biologic subtype is identified by comparing the biologic subtype associated with the regions of interest with known biologic subtypes; and discover a new diagnostic, prognostic, predictive, and/or therapeutic biologic subtype by correlating a new biologic subtype with patient, prognostic, predictive, therapeutic and/or clinical trial data.

Another aspect relates to a computer-readable medium. The computer readable medium may include at least at least one instruction for causing a computer to receive a data set associated with a cohort of biological specimens. The computer readable medium may also include at least one instruction for causing the computer to determine a potential number of dusters associated with the data set and at least one instruction for causing the computer to associate a duster with one or more data points in the data set. The computer readable medium may include at least one instruction for causing the computer to associate a cluster label with the one or more data points in the data set. The computer readable medium may include at least one instruction for causing the computer to treat a related duster as a biologic subtype and at least one instruction for causing the computer to associate a biologic subtype with one or more data points with regions of interest in the data set. The computer readable medium may include at least one instruction for causing the computer to establish duster features and metrics in the data set. In addition, the computer readable medium may include at least one instruction for causing the computer to determine if a new biologic subtype is identified by comparing the biologic subtype associated with the regions of interest with known biologic subtypes. The computer readable medium may also include at least one instruction for causing the computer to discover a new diagnostic, prognostic, predictive, and/or therapeutic biologic subtype by correlating a new biologic subtype with patient, prognostic, predictive, therapeutic and/or clinical trial data.

Additional advantages and novel features relating to aspects of the present invention will be set forth in part in the description that follows, and in part will become more apparent to those skilled in the art upon examination of the following or upon learning by practice thereof.

DETAILED DESCRIPTION

The described aspects relate to methods and systems for identifying cellular, tissue, biochemical, molecular and morphologic subtypes in an image of a biological specimen. The described aspects relate to methods and systems for processing a cohort of biological specimens. As a cohort-based process, the methods and systems may leverage the biological sample content data across a curated data set to find similarities and differences in the data (i.e. clusters and community groups). The methods and systems may apply the results of the cohort-based processing to individual samples and to a databased data set for diagnostic, prognostic and predictive analysis of samples. For example, the cohort-based results including subtype discovery may be applicable to individual samples in the cohort and sample (n+1) analyzed relative to the cohort.

The described aspects relate to methods and systems for inter-sample group clustering across a group of biological samples from a plurality of individuals to identify patterns shared across the group. The identified patterns of the group may be used to derive clinical decisions. The methods and systems may select a group of biological samples from a number of patients and analyze the spectral data of the group. The spectral data may be analyzed for subtle differences and/or similarities in the biological samples to identify subpopulations of patients in the group. As such, the subpopulations of patients may be identified based on the biochemical signatures in the spectral data. The subpopulations of patients may be used, for example, to identify new subtypes of diseases, treatment therapies, new regions of interest in the biological samples, identifying outlying patients, and reassign patient samples.

The methods and systems may include receiving a data set associated with a biological specimen (e.g., a data set being obtained from a database of such data sets). The methods and systems may also Include determining a potential number of similarity clusters associated with the data set (e.g., this determination being based on a selected model having two or more potential similarity clusters). In addition, the methods and systems may include assigning a similarity duster to each data point in the data set. The methods and systems may further include assigning a cluster number to each data point in the data set (e.g., the data set being grouped into any number of clusters, such as 2, 10, 20, 30, 40, or more).

By moving to inter-sample group based analysis, the described aspects provide methods and systems for identifying subtle or strong similarities and/or differences among biological samples in a group.

Figure 1A:
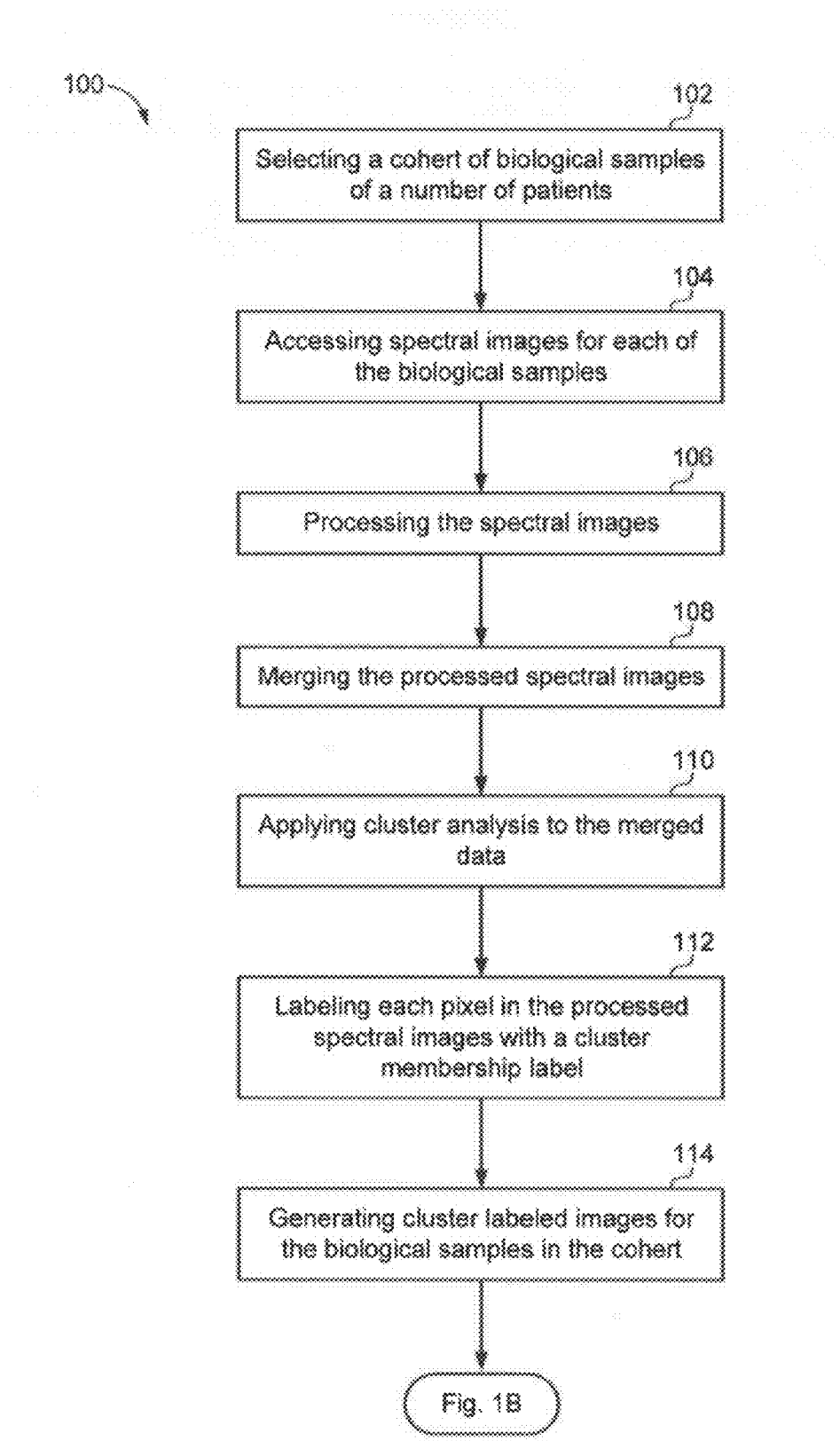
FIG. 1A and FIG. 1B illustrate an example method flow for identifying cellular subtypes in accordance with an aspect.
Figure 1B:
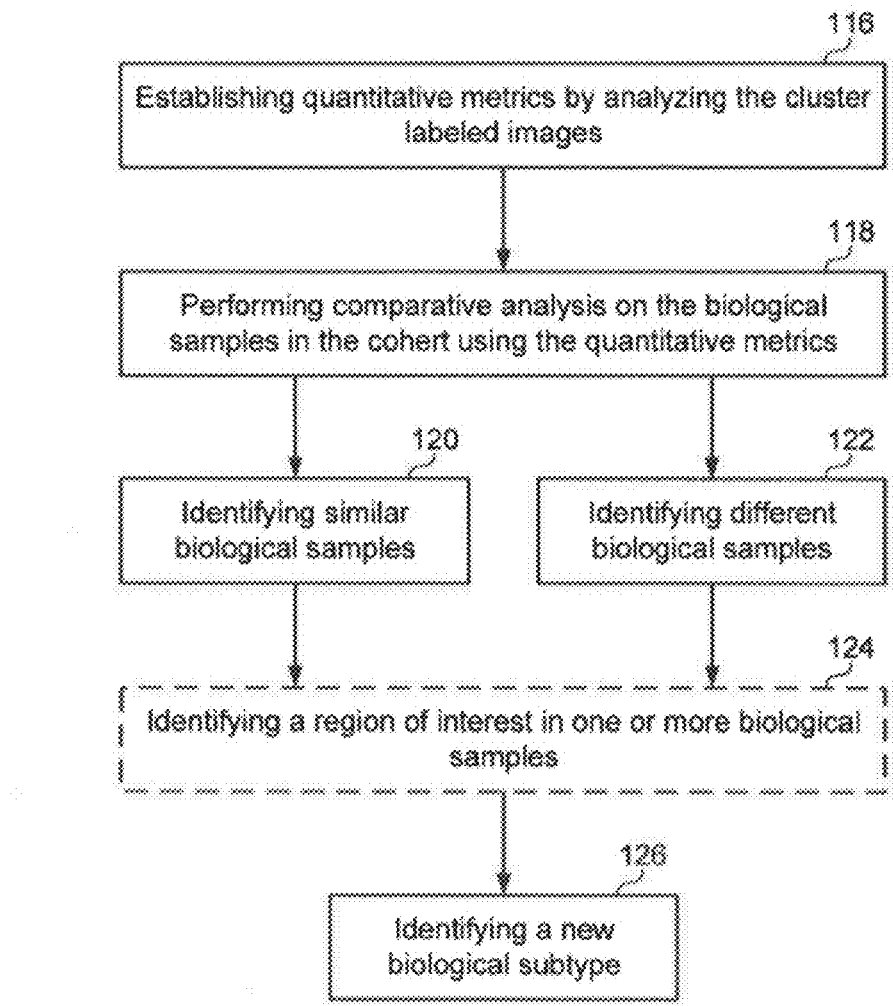

Referring now to FIG. 1A and FIG. 1B, illustrated therein is an example method flow 100 for identifying cellular subtypes in an image of a biological sample in accordance with an aspect. At 102, method 100 may include selecting a group of biological samples of a number of patient. The biological sample may include tissue or cellular material from an individual, such as a human or animal. In an aspect, the system may receive a request identifying a group of patients to include in a group. A group may be selected, for example, based on disease type, demographic data, therapies, therapeutic outcome, or for any other clinical reason. For example, a study in lung cancer subtype detection may start by filtering data for all patients with histology type equal to adenocarcinoma, squamous carcinoma or neuroendocrine types such as large cell and small cell carcinoma. A filtered set of samples may be grouped by patient demographics such as male, female or biomarker status such as gene alterations detected, immunohistochemistry, immunofluorescence and diagnostic testing results. The samples making up a group could be chosen by quantitative pathology features associated with a sample directly counted or derived by data mining and image processing methods when performing digital pathology analysis.

At 104, method 100 may also include accessing spectral images for each of the biological samples in the group. The infrared spectra of the tissue or cells represent a snapshot of the entire chemical or biochemical composition of the biological sample. The collection of the infrared spectra is discussed in more detail in related U.S. patent application Ser. No. 13/084,287. The system may access a data repository of spectral images and may retrieve the spectral images corresponding to each of the biological samples the cohort. In an aspect, the spectral images stored in the data repository may also have corresponding clinical or meta data associated with the biological sample, such as, but not limited to, information from an electronic medical record, patient diagnostic history, quantitative pathology metrics and measurements describing a sample, history of treatment therapies, tumor stage and response to therapies, immunohistochemistry reports, and molecular and next generation sequencing test results.

At 106, method 100 may include processing the spectral images. The system may preprocess the spectral data to create a compatible Infrared Spectroscopy (IR) data set. Preprocessing the spectral images may be helpful to isolate the data pertaining to the cellular material of interest and to remove confounding spectral features. Preprocessing the spectral images may also involve creating a binary mask to separate diagnostic from non-diagnostic regions of the sampled area to isolate the cellular data of interest. In addition, preprocessing the spectral images may permit the correction of dispersive line shapes in observed absorption spectra by a "phase correction" algorithm that optimizes the separation of real and imaginary parts of the spectrum by adjusting the phase angle between them. Preprocessing the spectral images is discussed in more detail in related U.S. patent application Ser. No. 13/067,777. By preprocessing the spectral image, a spectral dataset with compatible data for processing may be generated.

At 108, method 100 may also include merging the processed spectral images. The system may merge the processed spectral data. At 110, method 100 may include applying duster analysis to the merged data. For example, the system may apply a cluster analysis to the merged data.

At 112, method 100 may also include labeling each pixel in the processed spectral image with a duster membership label. In an aspect, the system may label each pixel of data in the sample with a cluster membership label.

At 114, method 100 may include generating cluster labeled images for the biological samples in the cohort. At 116, method 100 may include establishing quantitative metrics by analyzing the duster labeled images. At 118, method 100, may include performing comparative analysis on the biological samples in the cohort using the quantitative metrics. For example, the system may generate duster labeled images for the biological samples and establish quantitative metrics for the duster. The system may further perform comparative analysis on the biological samples in the cohort using the quantitative metrics.

At 120, method 100 may include identifying similar biological samples. The system may analyze the spectral data for subtle similarities in the biological samples to identify subpopulations of patients in the group. One way of finding similar samples may include comparing the duster composition. If the samples have the same composition they are similar. In an aspect, cluster metrics may be used. For example, duster metrics may include: a percent area overall, blob shape, number and size of clusters, list of all dusters (composition), adjacency of dusters, derived metrics including Voronoi cells using duster features, graph-based image analysis. For example, sub-populations may be discovered using duster metrics in combination with sample meta data, survival data, clinical and treatment data with Cox-regression and Kaplan-Meier analysis, or any other correlation method.

At 122, method 100 may include identifying different biological samples. The system may analyze the spectral data for subtle differences in the biological samples to identify subpopulations of patients in the group. One way of finding dissimilar sample may include comparing the duster composition. If the samples have different composition they are dissimilar. In an aspect, duster metrics may be used. For example, duster metrics may include: a percent area overall, blob shape, number and size of clusters, list of all clusters (composition), adjacency of dusters, derived metrics including Voronoi cells using duster features, graph-based image analysis. For example, sub-populations may be discovered using cluster metrics in combination with sample meta data, survival data, clinical and treatment data with Cox-regression and Kaplan-Meier analysis, or any other correlation method.

Optionally, at 124, method 100 may identify a region of interest in one or more biological samples. The system may use the subtle differences identified in the spectral data to identify regions of interest in the biological sample. As such, the subpopulations of patients may be identified based on the biochemical signatures in the spectral data.

At 126, method 100 may identify a new biological subtype. The system may identify a new biological subtype. The new biological subtype being a biological subtype that was not one of previously known subtypes, such as a different or new biological type. The new biological subtypes may be used to identify new subtypes of diseases, treatment therapies, new regions of interest in the biological samples, identifying outlying patients, and reassign patient samples.

Figure 2:
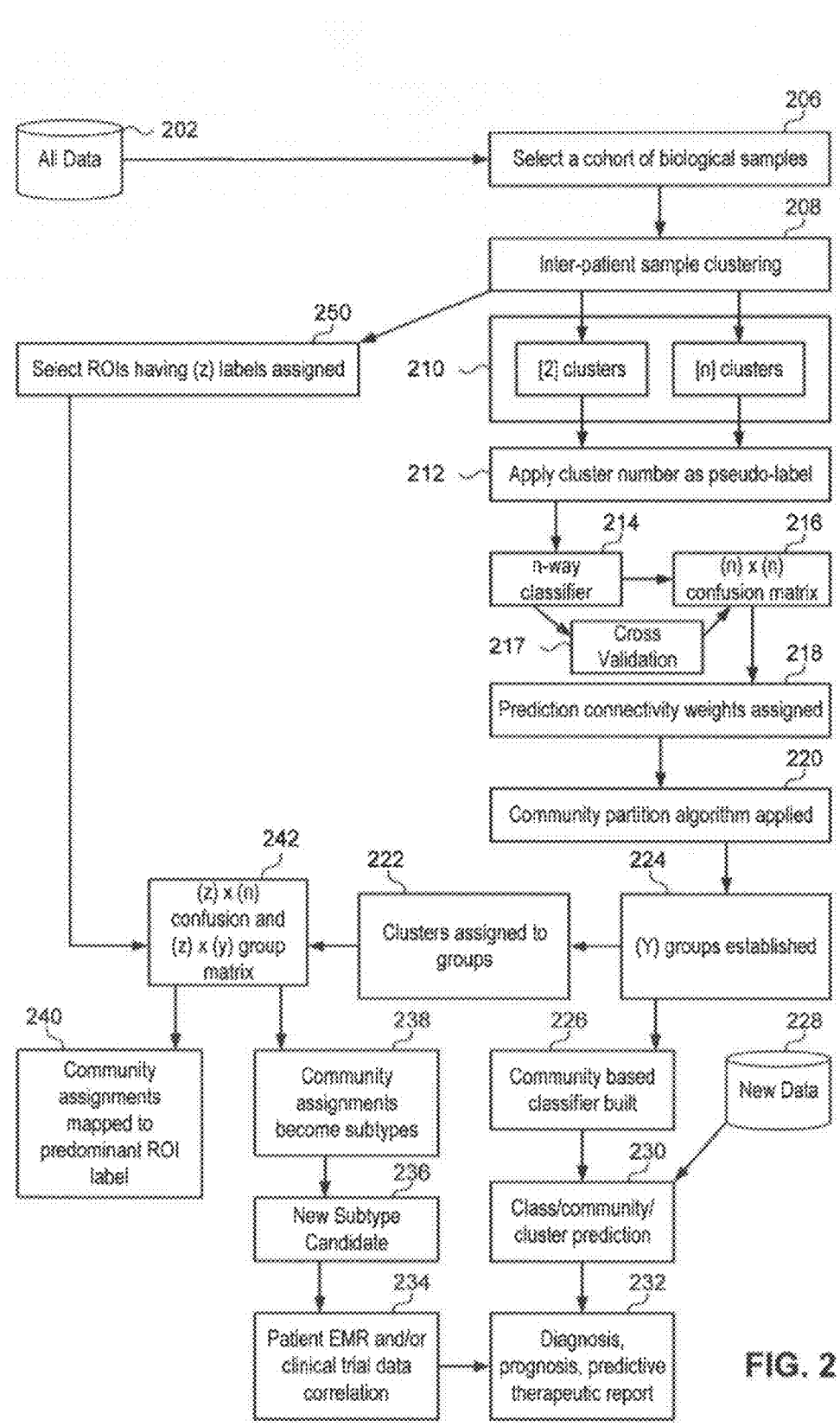
FIG. 2 illustrates an example method flow for identifying cellular subtypes in accordance with an aspect.

Referring now to FIG. 2, illustrated therein is an example method flow 200 for a clustering method in accordance with an aspect. At 206, method 200 may include selecting a cohort of biological samples (e.g., a data set of biological specimens) retrieved from a database 202. For example, the system may select a data set of biological specimens to retrieve from database 202. The data sets of biological samples may include pixels of an infrared image of the biological samples, where each pixel is an infrared spectrum. In addition, the cohort of biological samples may be selected based on, for example, demographic data, disease data, treatments, and therapy outcomes of patients associated with the biological samples.

At 208, method 200 may include performing inter-patient sample clustering on the cohort of biological samples. In an aspect, the system may perform inter-patient sample clustering on the cohort of biological samples.

At 210, method 200 may include determining a potential number of similarity clusters associated with the data set (e.g., this determination being based on a selected model having two or more potential similarity clusters). For example, the system may assign a similarity duster to each data point in the data set.

At 212, method 200 may further include assigning a duster number to each data point in the data set (e.g., the data set being grouped into any number of clusters, such as 2, 10, 20, 30, 40, or more). For example, the system may assign a cluster number to each data point in the data set.

At 214, method 200 may include applying a n-way classifier. The system may apply a n-way classifier. An n-way classifier may include using multiple binary classifiers and assigning a sample to one of (n) classes by the highest score achieved for all classifiers.

Furthermore, at 216, method 200 may include deriving a prediction confusion matrix for the data set based on the cluster number assigned to each data point (e.g., if the data set is grouped into 10 dusters, then a 10-way prediction confusion matrix being applied). For example, the system may derive a prediction confusion matrix for the data set. At 217, the system may include performing cross validation of the n-way classifier and the confusion matrix.

At 218, method 200 may include assigning prediction connectivity weights to the prediction confusion matrix. The system may assign prediction connectivity weights to the prediction confusion matrix. Predictability may be used to determine an optimal cluster number of a data set. The idea of cluster predictability may also be used to identify the clusters themselves. Elements in a prediction confusion matrix of the present method and system can be used to determine the connectivity between any pair of classes in the data set. In order to measure the 'confusability', the prediction connectivity for any two classes 'p' and 'q' may be defined as $PC(p,q)=D_{pq}+D_{qp}$. In addition, by using an adjacency matrix, the data from the feature structure may become a community structure.

At 220, method 200 may also include applying community algorithms to the community structure to perform the clustering of the data set. For example, the system may applying one or more community algorithms to the community structure to perform the clustering of the data set. Different criterion for clustering may be provided which improves unsupervised learning results. The unsupervised learning results may be used to update a database and/or algorithm used in future clustering and/or may be used for unsupervised classification of data.

At 224, method 200 may include establishing a number of groups based on the community algorithms applied to the community structure and, at 222, method 200 may include assigning dusters to the number of groups. For example, the system may establish a number of groups and assign the dusters to the number of groups. In an aspect, the system may receive IR image data comprised of pixels. Each image of a sample contributes thousands of pixels. The system may perform cross-patient (Inter-sample) clustering by hierarchical methods. Once clusters are established, the community may be established by removing the edges, for example, by Girvan-Newman. The biochemical signatures detected by Spectral Histopathology (SHP) may create community structures where the occurrence of groups of nodes are more densely connected internally. The number of communities may be a result of the optimization of the community partition analysis. For example, a very homogeneous samples may produce a single community. Another example may include producing three communities for Adenocarcinoma (ADC) versus Squamous Carcinoma (SqCC) lung cancer, where one community is a candidate for a new subtype, as illustrated, for example, in FIG. 4 with the one patient duster and mixed group.

At 226, an ever-expanding database may be built by duster membership when new data is added by matching of a seed data set cluster. In this way, duster membership is used to control the quality of the data set as new data is added and the database grows in size. Seed data sets may be built around cancer types, disease types and/or patient characteristics.

Figure 6:
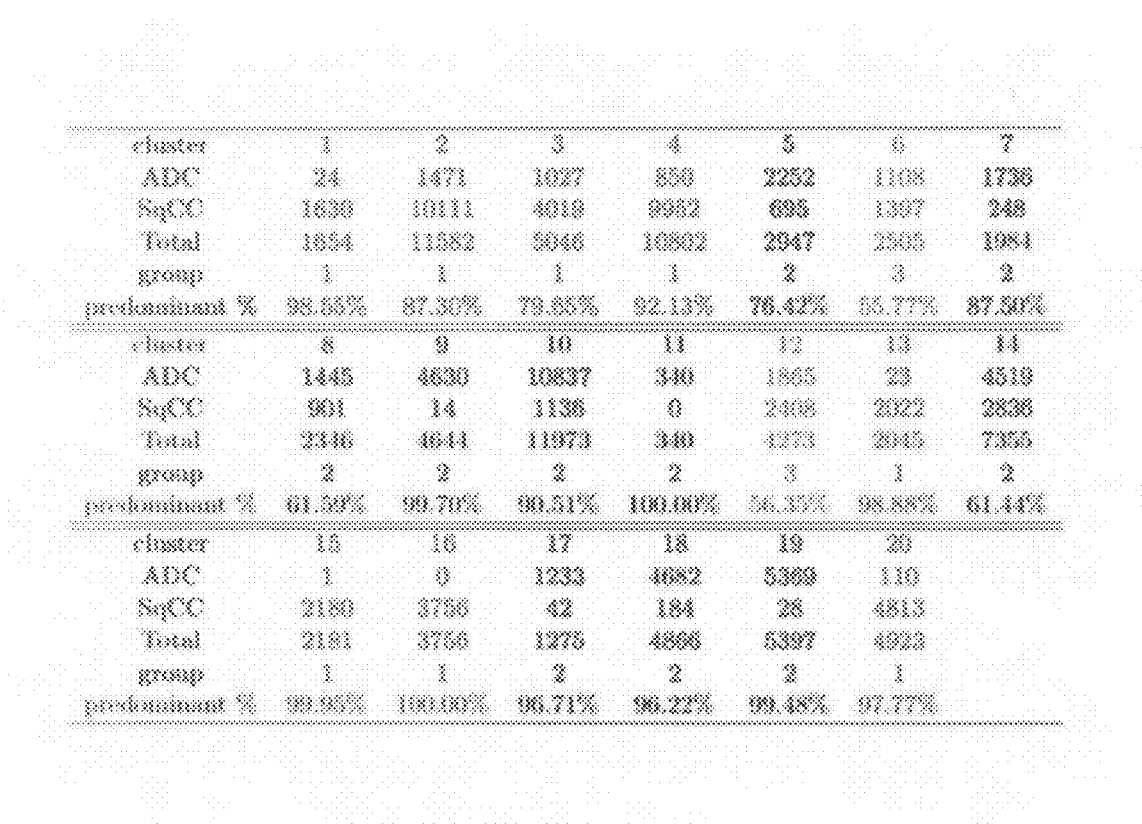
FIG. 6 illustrates example cluster data in accordance with an aspect.

At 242, method 200 may include generating a confusion and group matrix. The system may generate a confusion and group matrix. An example confusion matrix is illustrated in FIG. 6. In the example illustrated in FIG. 6, n=20 dusters and z=2, ADC and SqCC are the region of interest (ROI) labels (250) and y=3 for the community partition groups. Each cell of the confusion matrix indicates a pixel that is both annotated by one of the rows and part of the duster and the groups are shown at the bottom.

At 240, method 200 may map community assignments to a predominant region of interest (ROI) label. The system may map community assignments to a predominant ROI label. For example, in the confusion matrix Illustrated in FIG. 6, group number one is predominantly SqCC as indicated by there being more pixels assigned SqCC then ADC (max of the column is SqCC). As such, group one may be assigned SqCC.

Still further, at 238, method 200 may include determining biologic subtypes result of the data set by, for example, evaluating a graph partition of the confusion matrix (e.g., the duster result including a classification accuracy associated with the classification of the biologic subtypes). The system may process the data in the confusion matrix to determine biologic subtypes. In addition, biologic subtypes thus found can be associated with one or more data points in the dataset.

Moreover, at 236, method 200 may include determining if a new biologic subtype may be identified or potentially identified based on the biologic subtype result (e.g., the new biologic subtype being a biologic subtype that was not one of previously known subtypes—such as a different or new biologic type). The system may determine if a new biologic subtype may be identified based on the biologic subtype result.

Furthermore, at 234, method 200 may include correlating the new biologic subtype with patient records, diagnostic, prognostic, predictive, therapeutic or drug trial datasets to find new diagnostic, prognostic, predictive, and/or therapeutic subtypes. In an aspect, the system may correlate the new biological At 230, new data may be introduced to existing cluster models where new data is added to prior clustering. The new data may come from a database 228, for example from a single specimen or specimen data point or from a cohort not included in prior clustering. For example, the system may compare the new data and/or may duster the new data with existing data dusters as a way to find duster membership matches. An unsupervised duster membership match can be reported as an unsupervised classification of the new data with a prior cohort and/or specimen.

At 232, method 200 may include generating one or more reports. The system may generate one or more reports, such as, but not limited to diagnosis, prognosis, and/or predicitive therapeutic reports.

At 250, method 200 may include identifying a region of interest having a numbers of labels assigned. For example, the system may identify a subset of pixels annotated as ADC and SqCC and may apply the labels to the subset of pixels.

Figure 3:
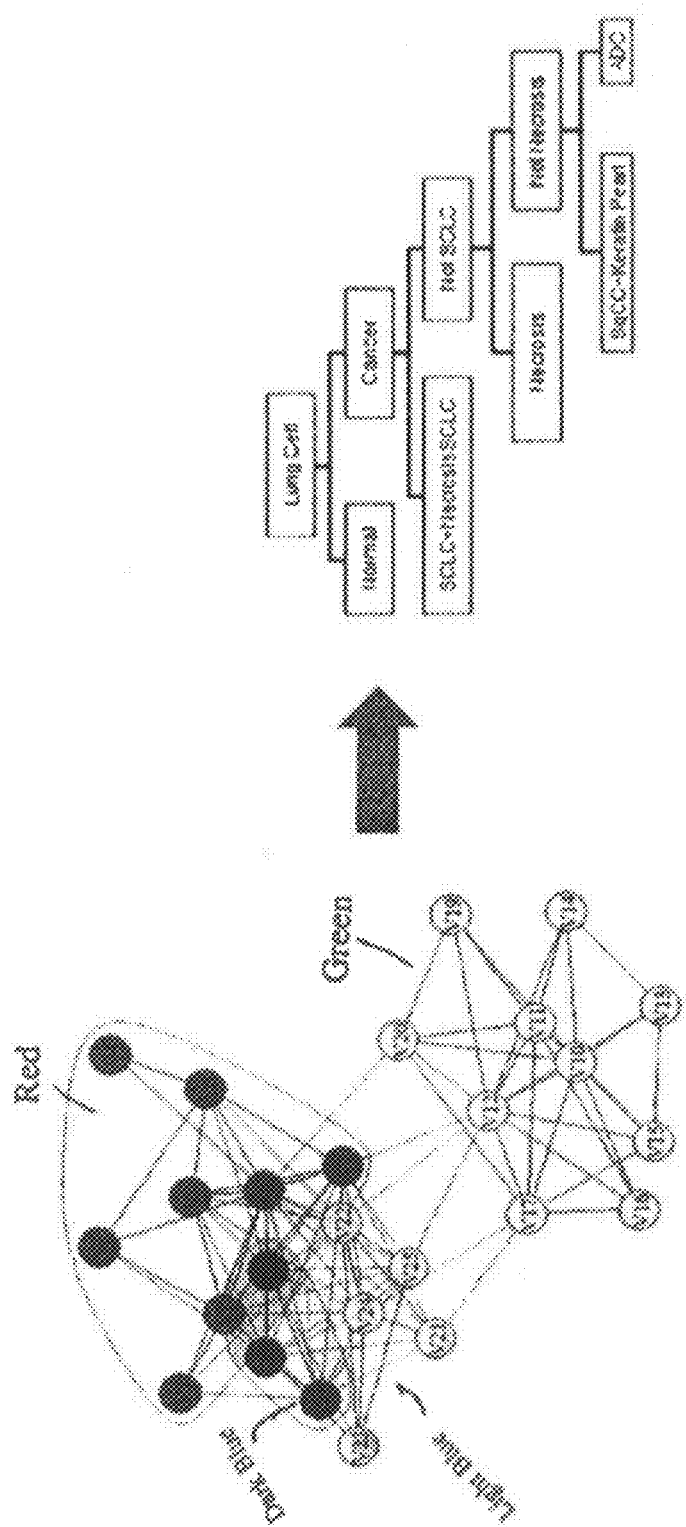
FIG. 3 illustrates an example decision tree in accordance with an aspect.

FIG. 3 describes and illustrates a decision tree that can be used in a duster analysis of class mean spectra used in determining cancer subtypes and grades in accordance with an aspect. For example, there may be over 50 tissue classes that are required to fully describe all specimens and desired tissue subtypes. The community structure 302 may be used to define the classification order. The community structure 302 may be include labels with colors that represent different diseases. For example, red may represent ADC, dark blue may represent SqCC, green may represent NOR, and light blue may represent Necrosis and Keratin. In addition, the community structure 302 may be used to guide a decision tree 304 for subsequent analysis of data sets. The analysis may result in a therapeutic decision affecting patient care and a report may be generated highlighting risk factors and probability of subtype classification and match results.

Figure 4:
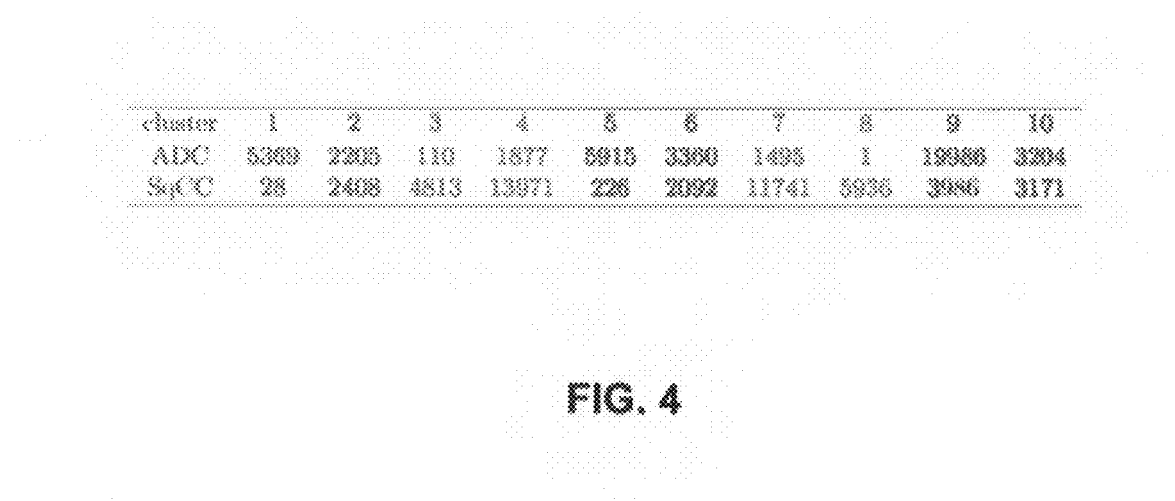
FIG. 4. illustrates example duster data in accordance with an aspect.
Figure 5:
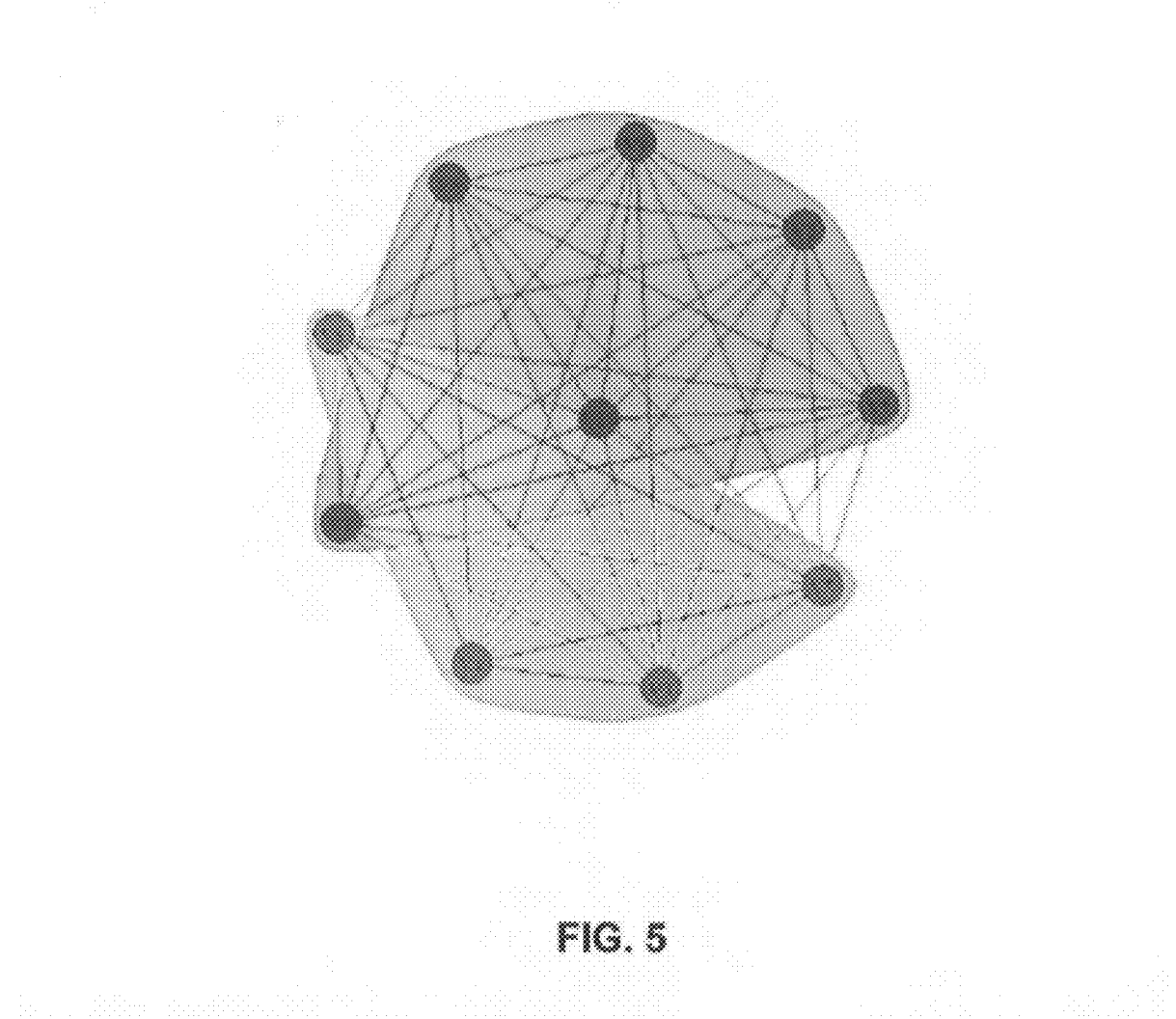
FIG. 5 illustrates an example graph in accordance with an aspect.

Referring now to FIG. 4, illustrated therein is an example chart 400 with example cluster data in accordance with an aspect. In an aspect, the system may set the number of clusters to be 10 and may generate chart 400 without knowing anything about the data set. Chart 400 may include an example HCA duster result for mixed SqCC and ADC data set with 10 dusters. FIG. 5 illustrates a graph 500 after running a LOOCV for 10-way confusion matrix on the data in chart 400 and applying a graph partition algorithm. The 4 blue clusters are V3, V4, V7, V8, the rest red group contains V1, V2, V5, V6, V9, V10. The blue represents ADC pixels and the red represents SqCC pixels. As the number of dusters increase, the results may become more accurate.

Figure 7:
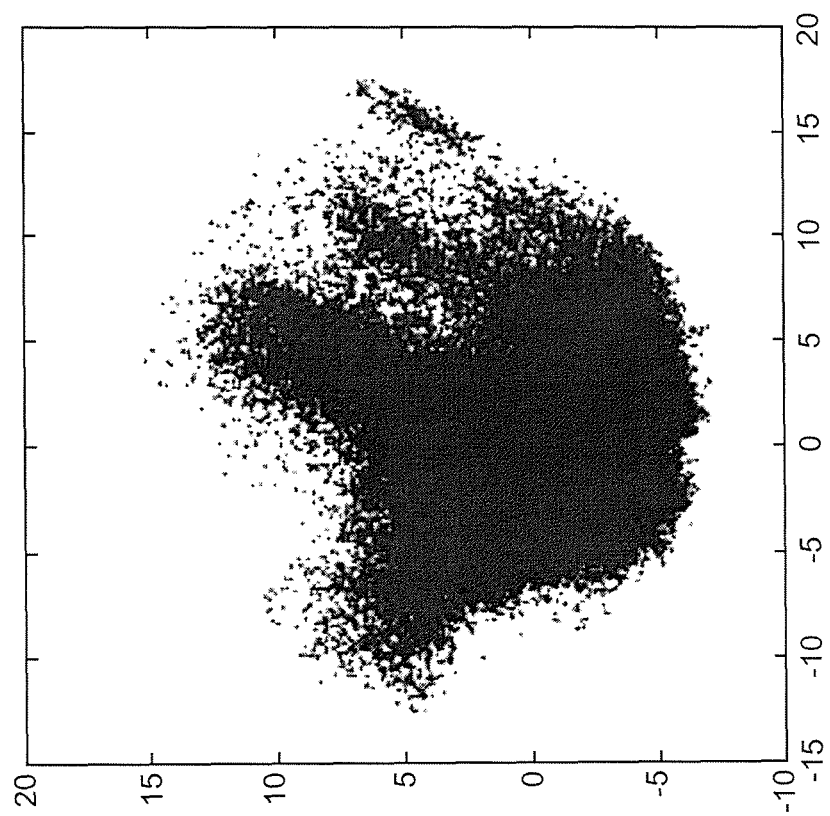
FIGS. 7-9 illustrate example PCA verifications in accordance with an aspect.
Figure 8:
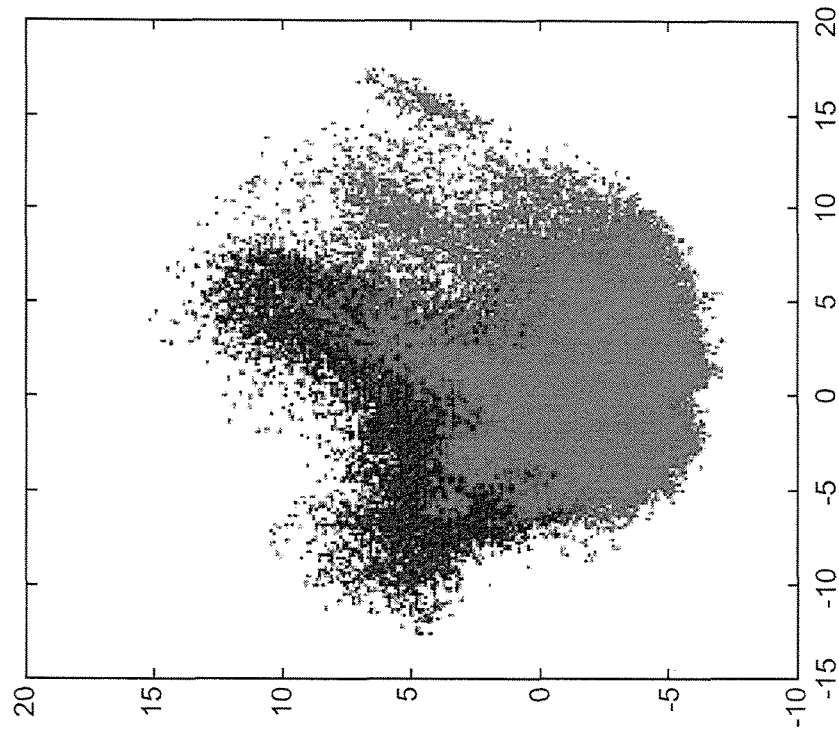
Figure 8:
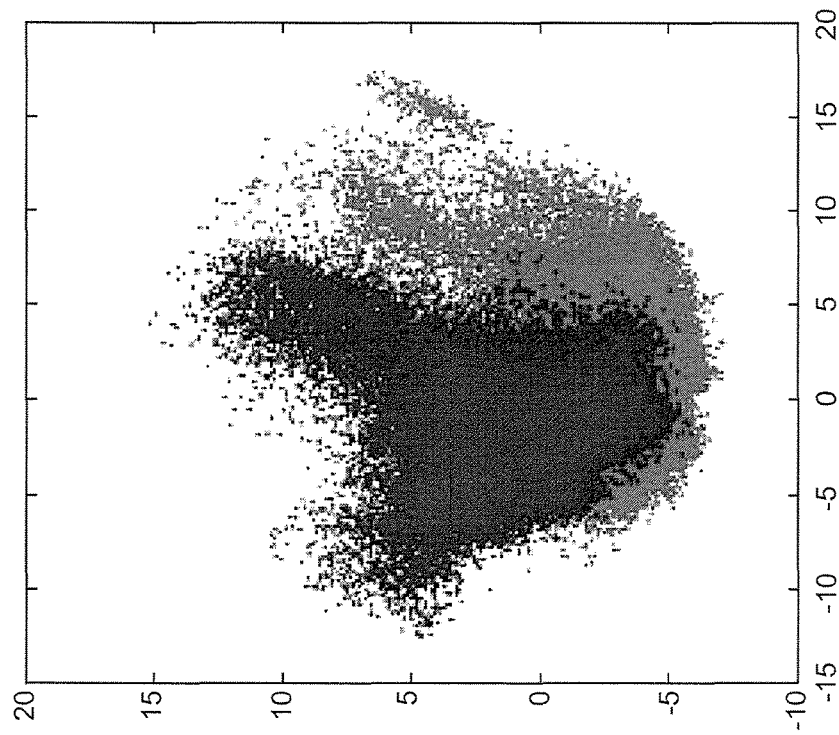
Figure 9:
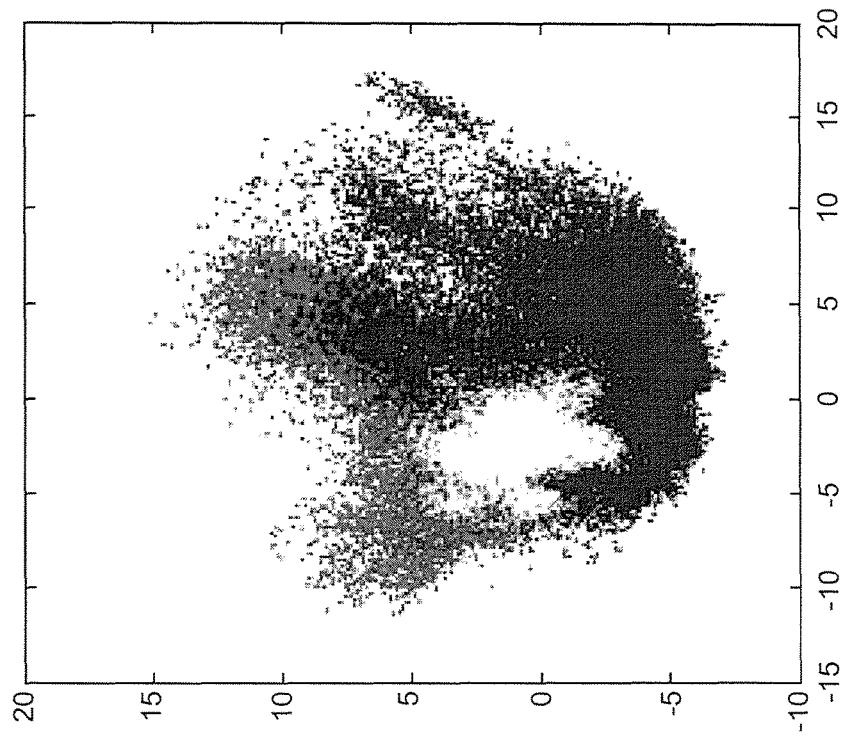
Figure 9:
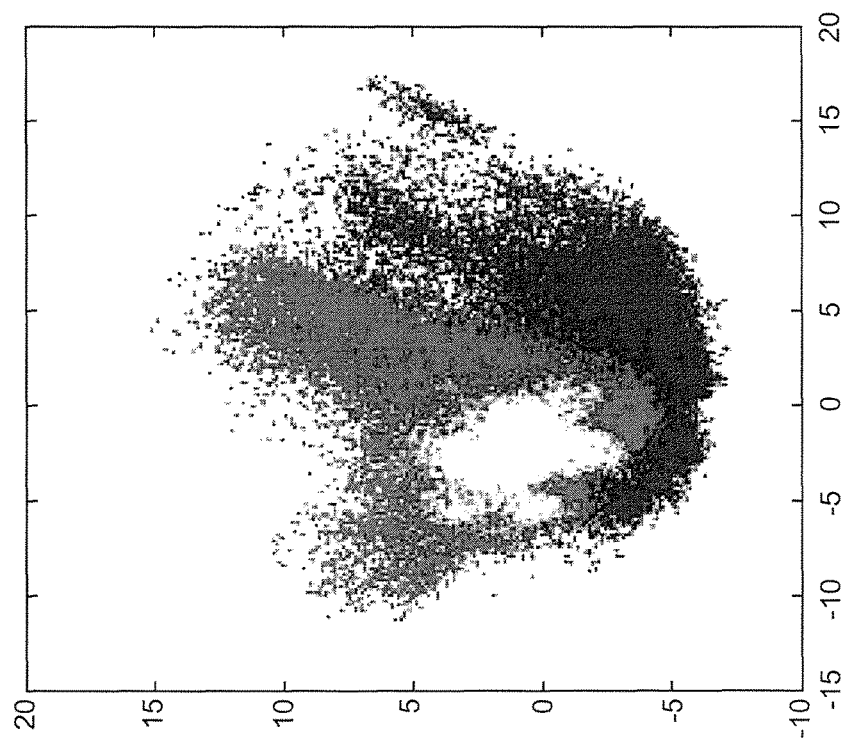

Referring now to FIGS. 7-9, illustrated are example figures Principal Component Analysis (PCA) verification in accordance with an aspect. FIG. 7 illustrates an example PCA verification for a SqCC and ADC data set in accordance with an aspect. The two plots illustrated in FIG. 7 are exactly the same. For example, by switching the order of the plots the overlap may be illustrated. FIG. 8 illustrates an example PCA verification for a SqCC and ADC data set in accordance with an aspect. The blue represents ADC pixels and the red represents SqCC pixels based on annotations provided by a pathologist FIG. 9 illustrates an example PCA verification for a SqCC and ADC data set in accordance with an aspect. The blue represents group one pixels, red represents group 2 pixels, and green represents group 3 pixels by re-clustering results. The verification illustrates in the PCA plot that there is more than one population (cluster) and two populations can be seen. The fact that they do not substantially overlap is verification there are separate ADC and SqCC populations in the data and a third population (green), group 3, is also present. As such, the dusters illustrated as PCA clouds show the groups are inherent in the raw biological data and not just mathematical aggregations.

Figure 10:
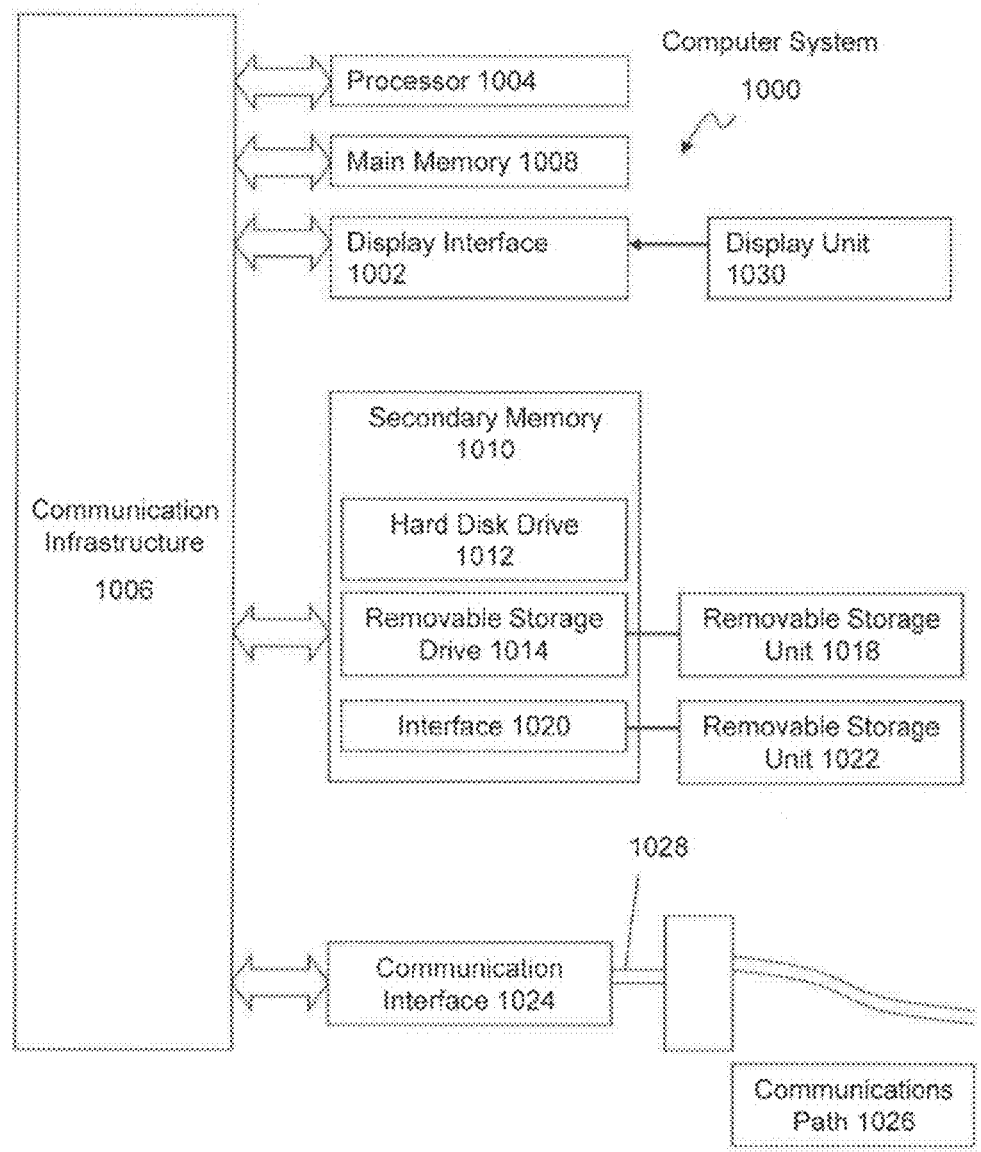
FIG. 10 illustrates various features of a computer system for use in conjunction with aspects.

FIG. 10 shows various features of an example system usable in accordance with aspects of the present invention. The system 1000 may include one or more accessors 1060, 1062 (also referred to interchangeably herein as one or more "users") and one or more terminals 1042, 1068. In one aspect, data for use in accordance with aspects of the present invention may, for example, be input and/or accessed by accessors 1060, 1062 via terminals 1042, 1068, such as personal computers (PCs), minicomputers, mainframe computers, microcomputers, telephonic devices, or wireless devices, such as personal digital assistants ("PDAs"), smart telephones, or other hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 1046, 1064. The couplings 1045, 1046, 1064 may include, for example, wired, wireless, or fiberoptic links. In another variation, the method and system in accordance with aspects of the present invention operate in a stand-alone environment, such as on a single terminal.

Figure 11:
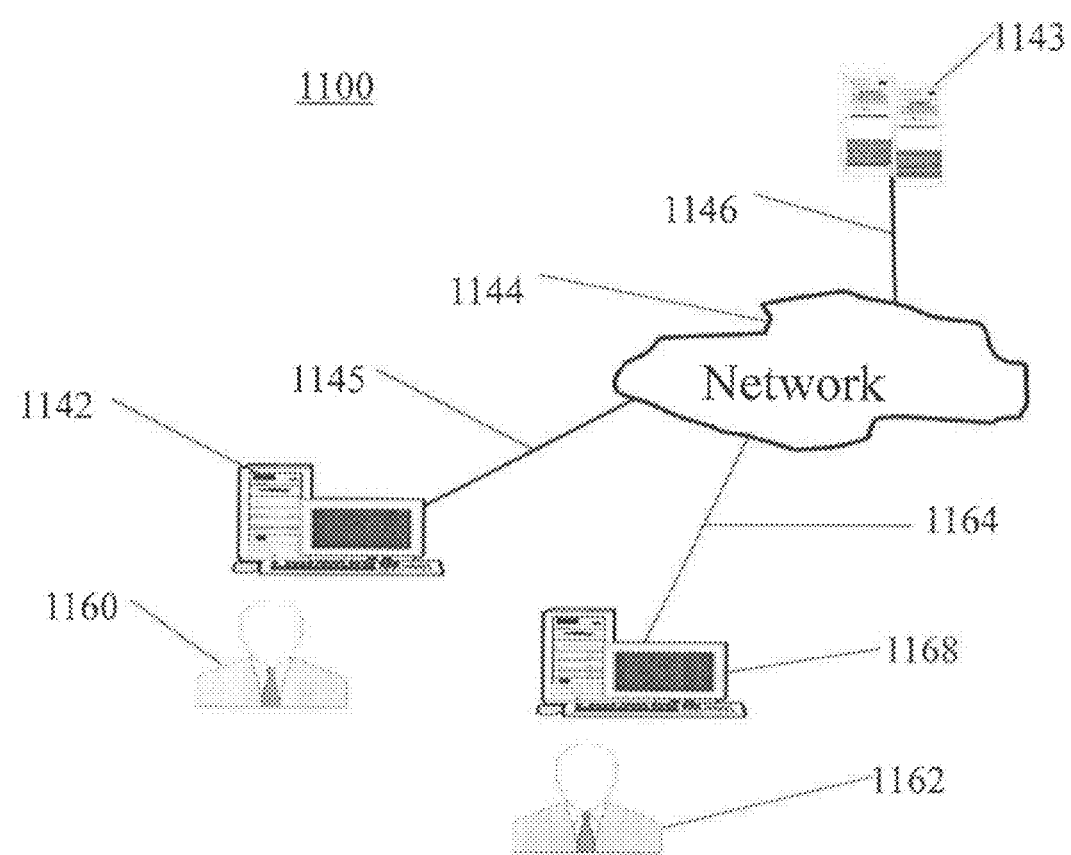
FIG. 11 illustrates an example computer system in accordance with an aspect.

Aspects of the invention may be implemented using hardware, software or a combination thereof and may be implemented in one or more computer systems or other processing systems. In one variation, aspects of the invention are directed toward one or more computer systems capable of carrying out the functionality described herein. An example of such a computer system 1100 is shown in FIG. 11.

Computer system 1100 may include one or more processors, such as processor 1104. The processor 1104 may be connected to a communication infrastructure 1106 (e.g., a communications bus, cross-over bar, or network). Various software aspects are described in terms of this exemplary computer system. After reading this description, it will become apparent to a person skilled in the relevant art(s) how to implement the aspects of invention using other computer systems and/or architectures.

Computer system 1100 can include a display interface 1102 that forwards graphics, text, and other data from the communication infrastructure 1106 (or from a frame buffer not shown) for display on the display unit 1130. Computer system 1100 also includes a main memory 1108, preferably random access memory (RAM). and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well-known manner. Removable storage unit 1118, represents a floppy disk, magnetic tape, optical disk, etc., which is read by and written to removable storage drive 1114. As will be appreciated, the removable storage unit 1118 includes a computer usable storage medium having stored therein computer software and/or data.

In alternative variations, secondary memory 1110 may include other similar devices for allowing computer programs or other instructions to be loaded into computer system 1100. Such devices may include, for example, a removable storage unit 1122 and an interface 1120. Examples of such may include a program cartridge and cartridge interface (such as that found in video game devices), a removable memory chip (such as an erasable programmable read only memory (EPROM), or programmable read only memory (PROM)) and associated socket, and other removable storage units 1122 and interfaces 1120, which allow software and data to be transferred from the removable storage unit 1122 to computer system 1100.

Computer system 1100 may also include a communications interface 2024. Communications interface 1124 allows software and data to be transferred between computer system 1100 and external devices. Examples of communications interface 1124 may include a modem, a network interface (such as an Ethernet card), a communications port, a Personal Computer Memory Card International Association (PCMCIA) slot and card, etc. Software and data transferred via communications interface 1124 are in the form of signals 1128, which may be electronic, electromagnetic, optical or other signals capable of being received by communications interface 1124. These signals 1128 are provided to communications interface 1124 via a communications path (e.g., channel) 1126. This path 1126 carries signals 1128 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1114, a hard disk installed in hard disk drive 1112, and signals 1128. These computer program products provide software to the computer system 1100. Aspects of the invention are directed to such computer program products.

Computer programs (also referred to as computer control logic) are stored in main memory 1108 and/or secondary memory 1110. Computer programs may also be received via communications interface 1124. Such computer programs, when executed, enable the computer system 1100 to perform the features in accordance with aspects of the invention, as discussed herein. In particular, the computer programs, when executed, enable the processor 1104 to perform such features. Accordingly, such computer programs represent controllers of the computer system 1100.

In a variation where aspects of the invention are implemented using software, the software may be stored in a computer program product and loaded into computer system 1100 using removable storage drive 1114, hard drive 1112, or communications interface 1124. The control logic (software), when executed by the processor 1104, causes the processor 1104 to perform the functions as described herein. In another variation, aspects of the invention are implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the invention are implemented using a combination of both hardware and software.

Additional advantages and novel features in accordance with aspects of the invention will be set forth in part in the description that follows, and in part will become more apparent to those skilled in the art upon examination of the following or upon learning by practice thereof.

The invention claimed is:

1. A method for identifying biologic subtypes in a biological specimen executed by a computer device comprising a memory and a processor, the method comprising:
   receiving an Infrared Spectroscopy (IR) data set for a plurality of biological samples associated with a cohort of biological specimens, wherein the data set includes spectral images that represent a chemical or biochemical composition for each of the plurality of biological samples;
   determining one or more clusters associated with the data set based upon applying a cluster analysis to the spectral images of the plurality of biological samples;
   generating cluster labeled images for the plurality of biological samples by associating each pixel of the spectral images with a cluster label for the one or more clusters;
   establishing quantitative metrics for the one or more clusters based at least upon the chemical or biochemical composition of the spectral images by analyzing the cluster labeled images;
   performing a comparative analysis of the plurality of biological samples in a cluster of the one or more clusters to identify similarities or differences in the plurality of biological samples based upon the quantitative metrics and analyzing the cluster composition of the spectral image corresponding to the plurality of biological samples;
   identifying at least one region of interest in at least one biological sample of the plurality of biological samples based upon the identified similarities or differences in the plurality of biological samples; and
   associating a biologic subtype with the at least one region of interest,
   wherein when the biologic subtype associated with the at least one region of interest is different from known biologic subtypes;
   identifying a new biologic subtype; and
   outputting a new diagnostic, prognostic, predictive, or therapeutic biologic subtype by correlating the new biologic subtype with patient, prognostic, predictive, therapeutic or clinical trial data, and wherein when the biologic subtype associated with the at least one region of interest is the same as a known biologic subtype:
  outputting a diagnostic, prognostic, predictive, or therapeutic biologic subtype by correlating the biologic subtype with patient, prognostic, predictive, therapeutic or clinical trial data of the known biologic subtype.

2. The method of claim 1, wherein each data point in the data set corresponds to a pixel of a multivariate image of the biological specimen.

3. The method of claim 1, further comprising determining an optimal number of clusters in the data set.

4. The method of claim 1, wherein determining if the new biologic subtype is Identified further comprises comparing the biologic subtype associated with the at least one regions of interest with annotated regions of interest.

5. The method of claim 1, wherein the similarities or differences in the plurality of biological samples identifies subpopulations of patients in the cluster.

6. A system for identifying biologic subtypes in a biological specimen, the system comprising:
  a memory in communication with a processor, wherein the memory and the processor are cooperatively configured to:
  receive an Infrared Spectroscopy (IR) data set for a plurality of biological samples associated with a cohort of biological specimens, wherein the data set includes spectral images that represent a chemical or biochemical composition for each of the plurality of biological samples;
  determine one or more clusters associated with the data set based upon applying a cluster analysis to the spectral images of the plurality of biological samples;
  generate cluster labeled images for the plurality of biological samples by associating each pixel of the spectral images with a cluster label for the one or more clusters;
  establish quantitative metrics for the one or more clusters based at least upon the chemical or biochemical composition of the spectral images by analyzing the cluster labeled images;
  perform a comparative analysis of the plurality of biological samples in a cluster of the one or more clusters to identify similarities or differences in the plurality of biological samples based upon the quantitative metrics and analyzing the cluster composition of the spectral image corresponding to the plurality of biological samples;
  identify at least one region of interest in at least one biological sample of the plurality of biological samples based upon the identified similarities or differences in the plurality of biological samples; and
  associate a biologic subtype with the at least one region of interest,
  wherein when the biologic subtype associated with the at least one region of interest is different from known biologic subtypes:
  identify a new biologic subtype; and
  output a new diagnostic, prognostic, predictive, or therapeutic biologic subtype by correlating a the new biologic subtype with patient, prognostic, predictive, therapeutic or clinical trial data, and
  wherein when the biologic subtype associated with the at least one region of interest is the same as a known biologic subtype:
  output a diagnostic, prognostic, predictive, or therapeutic biologic subtype by correlating the biologic subtype with patient, prognostic, predictive, therapeutic or clinical trial data of the known biologic subtype.

7. The system of claim 6, wherein each data point in the data set corresponds to a pixel of a multivariate image of the biological specimen.

8. The system of claim 6, wherein the processor is further configured to determine an optimal number of clusters in the data set.

9. The system of claim 6, wherein the processor is further configured to compare the biologic subtype associated with the at least one regions of interest with annotated regions of interest.

10. The system of claim 6, wherein the similarities or differences in the plurality of biological samples identifies subpopulations of patients in the cluster.

11. A non-transitory computer program product, comprising: a computer-readable medium comprising:
  at least one instruction for causing a computer to receive an Infrared Spectroscopy (IR) data set for a plurality of biological samples associated with a cohort of biological specimens, wherein the data set includes spectral images that represent a chemical or biochemical composition for each of the plurality of biological samples;
  at least one instruction for causing the computer to determine one or more clusters associated with the data set based upon applying a cluster analysis to the spectral images of the plurality of biological samples;
  at least one instruction for causing the computer to generate cluster labeled images for the plurality of biological samples by associating each pixel of the spectral images with a cluster label for the one or more clusters;
  at least one instruction for causing the computer to establish quantitative metrics for the one or more clusters based at least upon the chemical or biochemical composition of the spectral images by analyzing the cluster labeled images;
  at least one instruction for causing the computer to perform a comparative analysis of the plurality of biological samples in a cluster of the one or more clusters to identify similarities or differences in the plurality of biological samples based upon the quantitative metrics and analyzing the cluster composition of the spectral image corresponding to the plurality of biological samples;
  at least one instruction for causing the computer to identify at least one region of interest in at least one biological sample of the plurality of biological samples based upon the identified similarities or differences in the plurality of biological samples; and
  at least one instruction for causing the computer to associate a biologic subtype with the at least one region of interest,
  wherein when the biologic subtype associated with the at least one region of interest is different from known biologic subtypes:
  at least one instruction for causing the computer to identify a new biologic subtype; and
  at least one instruction for causing the computer to output a new diagnostic, prognostic, predictive, or therapeutic biologic subtype by correlating the new biologic subtype with patient, prognostic, predictive, therapeutic or clinical trial data, and
  wherein when the biologic subtype associated with the at least one region of interest is the same as a known biologic subtype:

at least one instruction for causing the computer to output a diagnostic, prognostic, predictive, or therapeutic biologic subtype by correlating the biologic subtype with patient, prognostic, predictive, therapeutic or clinical trial data of the known biologic subtype.

* * * * *